US008240459B2

United States Patent
Bernhard (10) Patent No.: US 8,240,459 B2
(45) Date of Patent: Aug. 14, 2012

(54) ACCELERATOR FEED ARRANGEMENT CONFIGURED TO ACCELERATE BLOW-MOLDED PET BEVERAGE BOTTLES FROM A LINEAR CONVEYOR TO A ROTARY PET BOTTLE STERILIZING MACHINE AND MINIMIZE MISALIGNMENT AND JAMMING OF BLOW-MOLDED PET BEVERAGE BOTTLES DURING TRANSPORT FROM A LINEAR CONVEYOR TO A ROTARY PET BOTTLE STERILIZING MACHINE

(75) Inventor: Herbert Bernhard, Wolfsheim (DE)

(73) Assignee: KHS GmbH, Dortmund (DE)

( * ) Notice: Subject to any disclaimer, the term of this patent is extended or adjusted under 35 U.S.C. 154(b) by 486 days.

(21) Appl. No.: 12/471,111

(22) Filed: May 22, 2009

(65) Prior Publication Data

US 2010/0136159 A1  Jun. 3, 2010

Related U.S. Application Data

(63) Continuation-in-part of application No. PCT/EP2007/009691, filed on Nov. 8, 2007.

(30) Foreign Application Priority Data

Nov. 23, 2006  (DE) .......................... 10 2006 055 317

(51) Int. Cl.
  *B65G 47/84*  (2006.01)
  *B65G 29/00*  (2006.01)
(52) U.S. Cl. .................................. 198/481.1; 198/803.3
(58) Field of Classification Search ............... 198/470.1, 198/473.1, 480.1, 481.1, 803.3
See application file for complete search history.

(56) References Cited

U.S. PATENT DOCUMENTS 4,312,439 A * 1/1982 Young ........................... 198/433
(Continued)

FOREIGN PATENT DOCUMENTS

DE  80 27 909  2/1981
(Continued)

OTHER PUBLICATIONS

English translation of Chinese Office Action 200780039757.X.
(Continued)

*Primary Examiner* — Robert B Davis
(74) *Attorney, Agent, or Firm* — Nils H. Ljungman & Associates (57) ABSTRACT

An accelerator feed arrangement configured to accelerate blow-molded pet beverage bottles from a linear conveyor to a rotary pet bottle sterilizing machine and minimize misalignment and jamming of blow-molded pet beverage bottles during transport from a linear conveyor to a rotary pet bottle sterilizing machine. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 7 Drawing Sheets

U.S. PATENT DOCUMENTS

| | | | |
|---|---|---|---|
| 4,442,934 A | * | 4/1984 | Dorf et al. .................... 198/379 |
| 4,939,890 A | | 7/1990 | Peronek et al. |
| 5,373,934 A | * | 12/1994 | Jackson et al. ............ 198/803.8 |
| 2003/0106779 A1 | | 6/2003 | Stocchi |

FOREIGN PATENT DOCUMENTS

| | | |
|---|---|---|
| DE | 195 12 860 | 10/1996 |
| EP | 06 16 971 | 9/1994 |
| WO | WO 01/62636 | 8/2001 |

OTHER PUBLICATIONS

International Search Report PCT/EP2007/009691 and English translation thereof mailed Mar. 18, 2008.

\* cited by examiner

FIG. 5

ACCELERATOR FEED ARRANGEMENT CONFIGURED TO ACCELERATE BLOW-MOLDED PET BEVERAGE BOTTLES FROM A LINEAR CONVEYOR TO A ROTARY PET BOTTLE STERILIZING MACHINE AND MINIMIZE MISALIGNMENT AND JAMMING OF BLOW-MOLDED PET BEVERAGE BOTTLES DURING TRANSPORT FROM A LINEAR CONVEYOR TO A ROTARY PET BOTTLE STERILIZING MACHINE

CONTINUING APPLICATION DATA

This application is a Continuation-In-Part application of International Patent Application No. PCT/EP2007/009691, filed on Nov. 8, 2007, which claims priority from Federal Republic of Germany Patent Application No. 10 2006 055 317.9, filed on Nov. 23, 2006. International Patent Application No. PCT/EP2007/009691 was pending as of the filing date of this application. The United States was an elected state in International Patent Application No. PCT/EP2007/009691.

BACKGROUND

1. Technical Field

The present application relates to an accelerator feed arrangement configured to accelerate blow-molded pet beverage bottles from a linear conveyor to a rotary pet bottle sterilizing machine and minimize misalignment and jamming of blow-molded pet beverage bottles during transport from a linear conveyor to a rotary pet bottle sterilizing machine.

2. Background Information

Background information is for informational purposes only and does not necessarily admit that subsequently mentioned information and publications are prior art.

The present application relates to an apparatus for container transport with a rotating infeed disk which grasps a container in its top mouth area.

Devices of this type are used in the beverage industry to feed containers such as PET containers, for example, to a container treatment plant such as a beverage filling plant, for example. For this purpose the containers are held in the vicinity of their heads, in the case of PET bottles on the encircling collar underneath the bottle opening and delivered to the container treatment machine via pneumatic conveyor systems for example. During this process, they must or should be accelerated to a sufficient speed for feeding into the treatment machine. In some systems, this acceleration is accomplished by infeed disks which grasp the bottle in the vicinity of the head and accelerate it by rotating it over a circular arc. At that point the bottles are then picked up by a downstream transport system and delivered to the machine at the increased speed.

In at least one possible embodiment of the present application, the guidance of the bottle in the head area makes possible a more secure transport of the bottle over long distances, regardless of the size of the bottle.

One disadvantage of some of the solutions, however, is that the bottles are not always or may not always transported reliably and smoothly, for example when high accelerations and high throughputs must or should be achieved. In those cases, bottles repeatedly tip over or become jammed.

OBJECT OR OBJECTS

An object of the present application is to significantly improve these transport devices so that the reliability of transport can be improved even at high throughput speeds and accelerations.

SUMMARY

The present application teaches that this object can be accomplished by an apparatus for container transport with a rotating infeed disk which grasps a container in its top mouth area and/or neck area, wherein an additional, co-rotating guide device is provided which acts on the container in its lateral and/or lower area.

A co-rotating guide device is provided which, in addition to grasping the containers in the vicinity of the top, also guides and/or supports them laterally and/or in the lower region. The co-rotation of the guide device prevents, restricts, and/or minimizes the containers from tipping and jamming when the force is applied exclusively or substantially exclusively in the vicinity of the top of the bottle and the resulting accelerations and inertial forces. Instead, the container is propelled and accelerated uniformly over its full height. Under these conditions, a more secure transport can be achieved for large PET bottles, for example.

Additional embodiments of the present application are described according to the present application.

In different configurations of the present application the guide device taught by the present application can also perform additional tasks. For example, it can guide and support the container during the transport process. It can also propel the container or protect it from falling down out of the apparatus.

The guide device is in one possible embodiment realized so that it grasps the container in a lower lateral area. If necessary and/or desired, alternatively or additionally, a grasping of the container in the area of the bottom may also be appropriate.

In one possible embodiment of the present application, the guide device has a wheel flange which grasps and transports the bottles. Alternatively or additionally the guide device can also have a base which grasps the containers in the vicinity of their bottoms.

In one configuration, for example, the guide device is connected with the infeed disk by means of stud bolts, which makes, in one possible embodiment, a simple realization possible. This arrangement automatically essentially ensures or promotes that the guide device rotates together with the infeed disk and thereby essentially guarantees or promotes a uniform guidance of the container over its full length.

In at least one possible embodiment according to the present application, the height and/or the diameter of the guide device is adjustable. This capability is possible if the plant and thus the apparatus according to the present application are used to process containers with different dimensions. Because the bottles are guided exclusively in the vicinity of the tops, the plants are basically independent of the size of the container underneath them. To realize this capability with the apparatus according to the present application, it is appropriate to make the guide device adjustable so that a secure or substantially secure guidance and thus a secure or substantially secure transport can also be achieved with containers of different sizes.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Additional embodiments and characteristics of the present application are described in greater detail below with reference to the accompanying drawings, in which.

DESCRIPTION OF EMBODIMENT OR EMBODIMENTS

Figure 1:
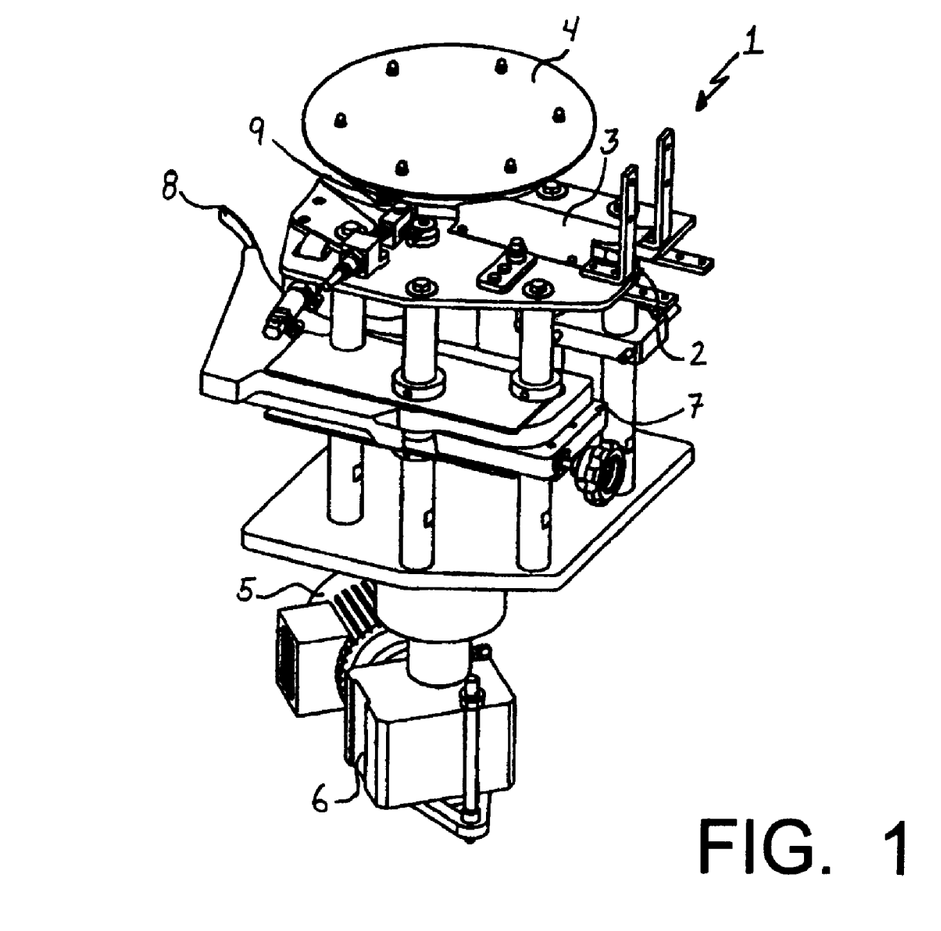
FIG. 1 is a three-dimensional side view of an apparatus for the transport of containers.

An apparatus not showing all the components of feeding arrangement of the present application illustrated in FIG. 1 is designated 1 in general for the transport of containers 9, which are fed laterally to the transport point 2. The containers 9 being transported can be PET bottles 9 for beverages, for example. These containers 9 are transported by being grasped in the vicinity of their heads, for example by means of pneumatic transport systems (not shown). For example, the containers may comprise neck rings or flanges, and the transport system or container grippers may support or hold the container by the neck rings or neck flanges. The head of the container 9, after the transfer to the transfer point 2, is moved by a guide rail 3 to a rotating infeed disk 4. The infeed disk 4 is rotated by an electric motor 5 with gearing 6. In at least one possible embodiment of the present application, the infeed disk 4 is rotated in a clockwise direction. The infeed disk 4 grasps the container 9 in the vicinity of its head and accelerates it so that after a partial rotation of the infeed disk 4, it can be transferred to the next treatment station located behind it which is not shown in any further detail. A stationary stop guide 7 with a trailing stop rail 8 provides lateral support during transport for the containers, which are hanging down.

In this manner, each container 9 is accelerated to the speed necessary and/or desired for the infeed into the next downstream machine.

Figure 1A:
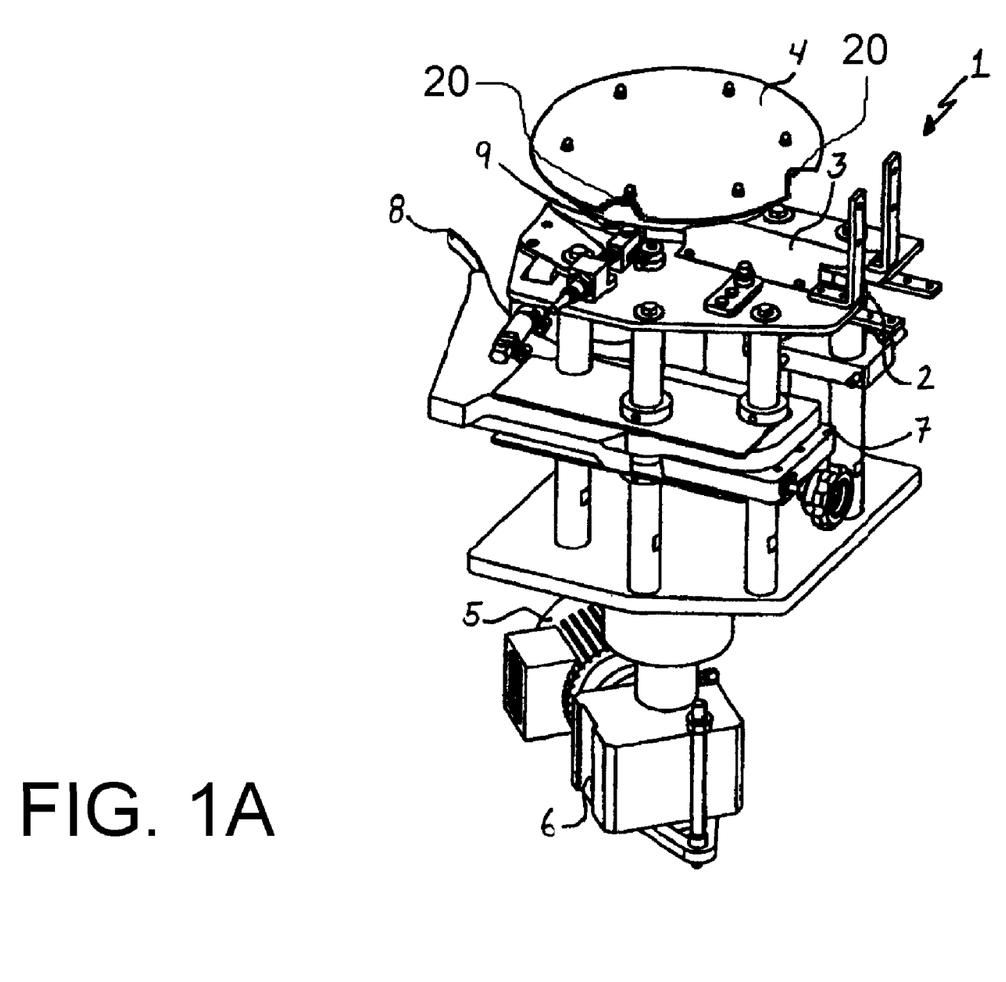
FIG. 1A shows another three-dimension side view of an apparatus for the transport of containers including grippers or recesses for the holding of containers.

FIG. 1A shows a similar embodiment of an apparatus for the transport of containers 9. Included in FIG. 1A is a plurality of grippers 20 or recesses 20 disposed about the periphery of the infeed disk for the grasping of containers 9 around the neck area or mouth area of the containers 9. In further embodiments of the feed arrangement or accelerator feed arrangement may comprise fewer or more grippers 20.

Figure 2:
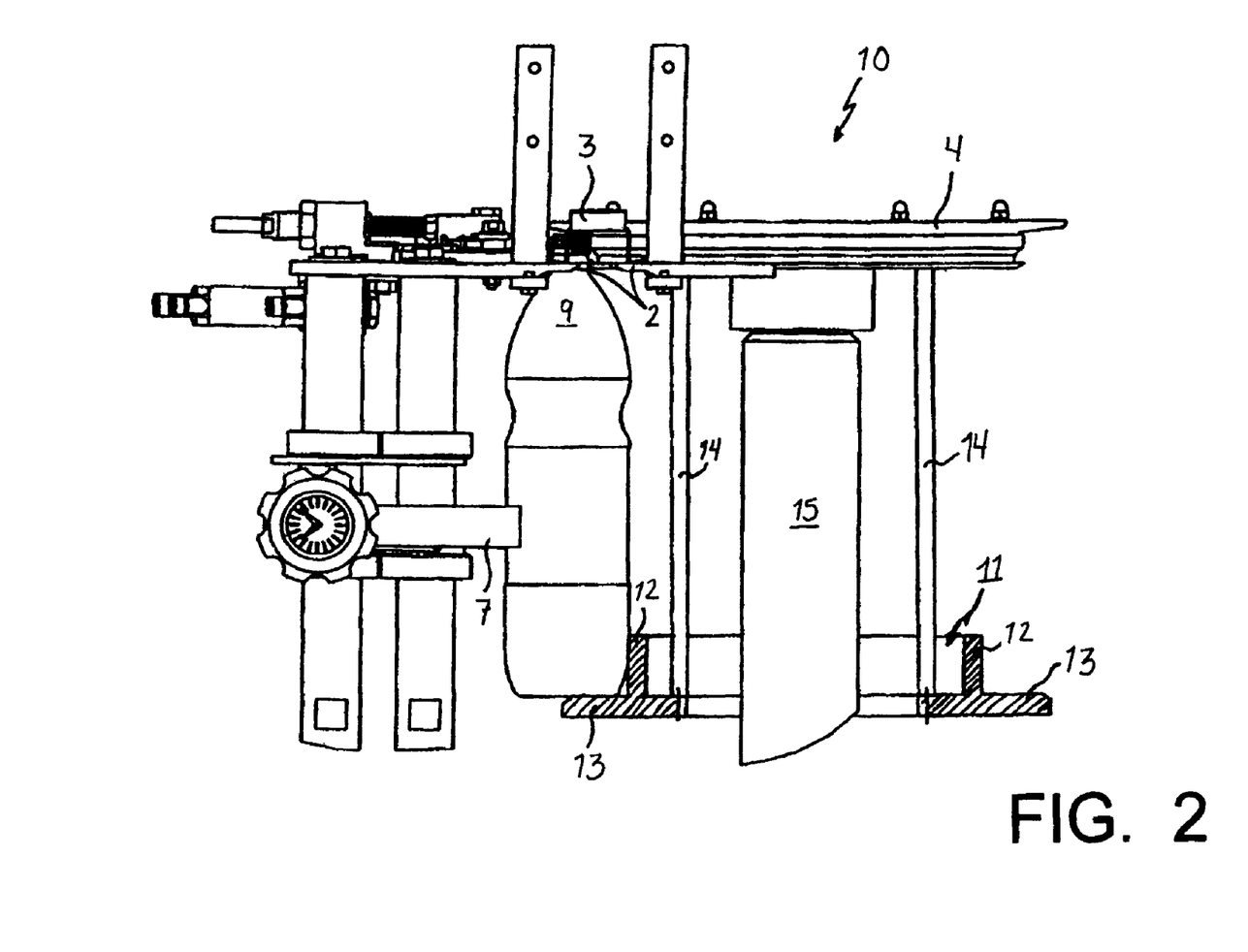
FIG. 2 is a side view of the apparatus according to the present application.
Figure 2A:
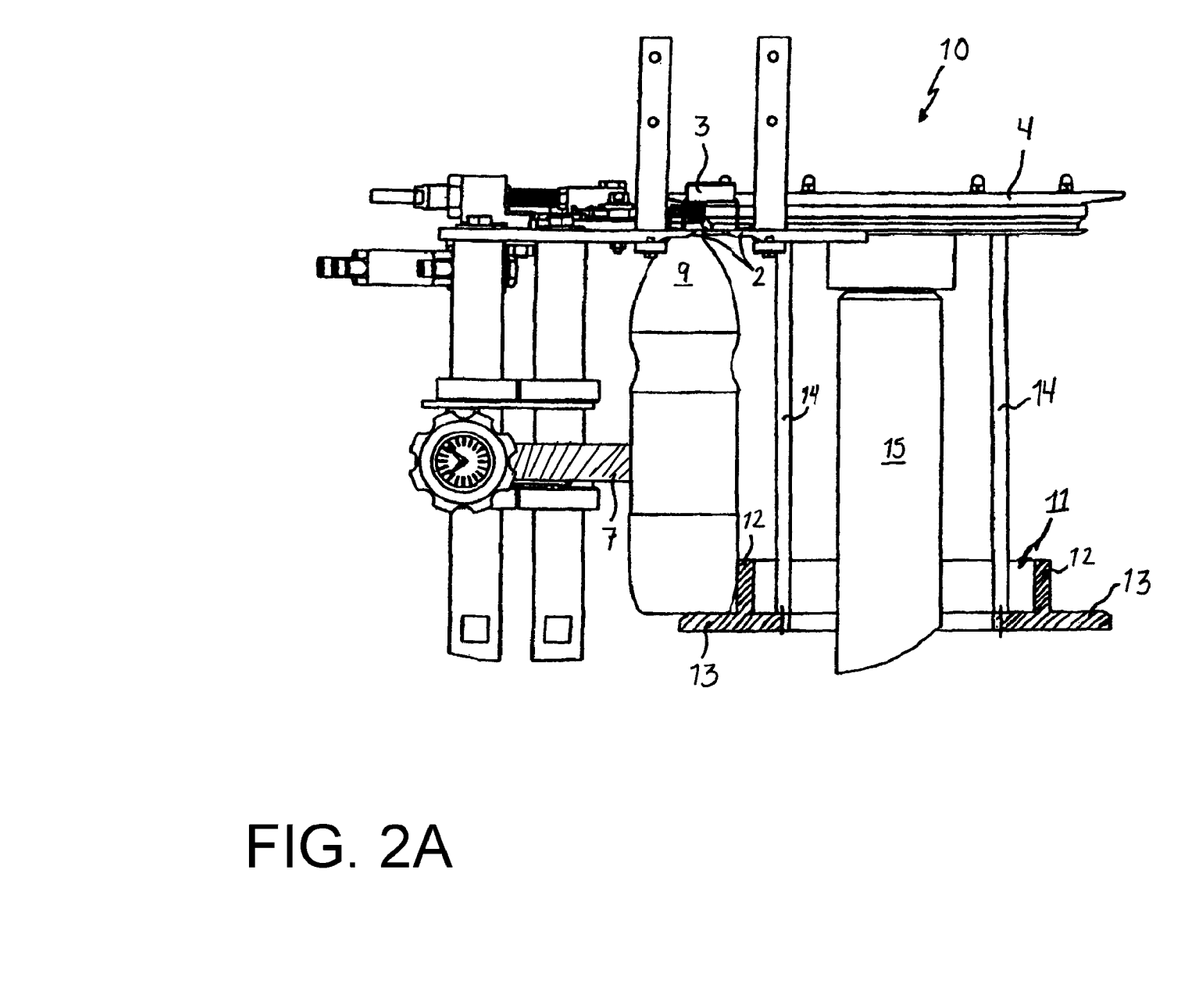
FIG. 2A shows another side view of the apparatus according to the present application.

The apparatus 10 according to the present application, which is illustrated in greater detail in FIG. 2, also has the transfer point 2, the guide rail 3 and the rotating infeed disk 4, the drive of which is not illustrated in any further detail in FIG. 2 and is constructed analogous to the one illustrated in FIG. 1.

Also present are a stationary stop guide 7 and the stop rail 8, which is not visible in the drawing.

The apparatus 10 according to the present application also has a guide device 11. It is realized in the form of a wheel flange 12 which is constructed so that it supports the container 9 in its lower lateral area toward the axis of rotation 15. The guide device 11 also has a ring-shaped base 13 which supports the containers 9 in the area toward the bottom.

The guide device 11 is connected with the infeed disk 4 by means of stud bolts 14 and therefore rotates along with it.

In at least one possible embodiment of the present application, the wheel flange 12 and base 13 contribute to the guidance the container 9 during rotation and the resulting acceleration and push it downward. They also drive the container 9. This arrangement prevents, restricts, and/or minimizes the containers 9 from tipping, which occurs in similar systems like that seen in FIG. 1 because the acceleration causes place in the head area. The support provided also prevents, restricts, and/or minimizes the container 9 from falling downward. Containers 9 that are not perfectly vertical, or are substantially vertical but are delivered to the transfer point 2 in different inclined positions, are placed upright by the guide device 11 and therefore are introduced in an upright position into the next treatment machine. The susceptibility of the overall plant to problems and operational interruptions is therefore significantly reduced.

In a realization of the present application which is not illustrated in any further detail, both the stud bolts 14 and the guide device 11 are adjustable, so that the distance to the infeed disk 4 and the diameter of the wheel flange 12 are variable. In this manner, the overall plant can be easily adapted to different sizes of containers 9 to be treated.

In other words and in accordance with at least one possible embodiment of the present application, the apparatus of the present application 10 is configured to accept containers 9 at a transfer point or inlet 2 of the apparatus 10. The movement of the container 9 is guided by the guide rail 3. The head of a container 9 is grasped in the apparatus 10 by grippers or supports, and the base or bottom portion of the container 9 is also grasped by a base 13 and a wheel flange 12 of a guide device 11. The guide device 11 is operatively connected to an infeed disk 4 of the apparatus 10 by a plurality of stud bolts 14. Both the infeed disk 4 and the guide device 11 rotate and accelerate the container 9. The guide device 11 may support the container 9 as the container 9 rotates and accelerates, and the guide device 11 may also restrict or minimize any tipping and/or jamming of the containers 9 as they are rotated because the container 9 is accelerated over the height of the container 9 rather than in the area of the head of the container 9.

Additionally, if a container 9 is fed into the apparatus 10 when that container 9 is not vertically or substantially vertically aligned, the container 9 may be placed into a more vertical position by the guide device 11 as the device 11 supports or grasps the base or bottom of the container 9. By placing the container 9 in a substantially vertical position, jamming of the containers 9 is restricted or minimized and a constant or substantially constant movement of bottles or containers 9 through the apparatus 10 is promoted.

The container 9 is stabilized or substantially stabilized as it is accelerated by the gripper in the head region of the container 9, the wheel flange 12 and base 13 of the guide device 11, and also by a stop guide 7. While the guide device 11 may restrict or minimize the container 9 from tilting on the side of the container 9 closer to the axis of rotation 15, the stop guide 7 may restrict or minimize the container 9 from tilting on the side of the container 9 farther from the axis of rotation 15. In other words, the container 9 may be restricted from moving tangentially, swinging outwardly or inwardly, or swaying during transport in the apparatus 10. Because the container 9 is stabilized or substantially stabilized on each side of the container 9 as well as in the head region and the base region of the container 9, a vertical or substantially vertical feed of containers 9 is promoted.

FIG. 2 shows an additional embodiment of the apparatus 10 of the present application. In this illustrated embodiment, the a cross section of the stop rail 7 is seen, which may contact and guide the side of the container 9 which is disposed farther from the axis of rotation 15 than the other side of the container 9. This stop rail 7 may curve along the path of the containers 9 as the containers 9 move in the feeding arrangement 10.

Figure 3:
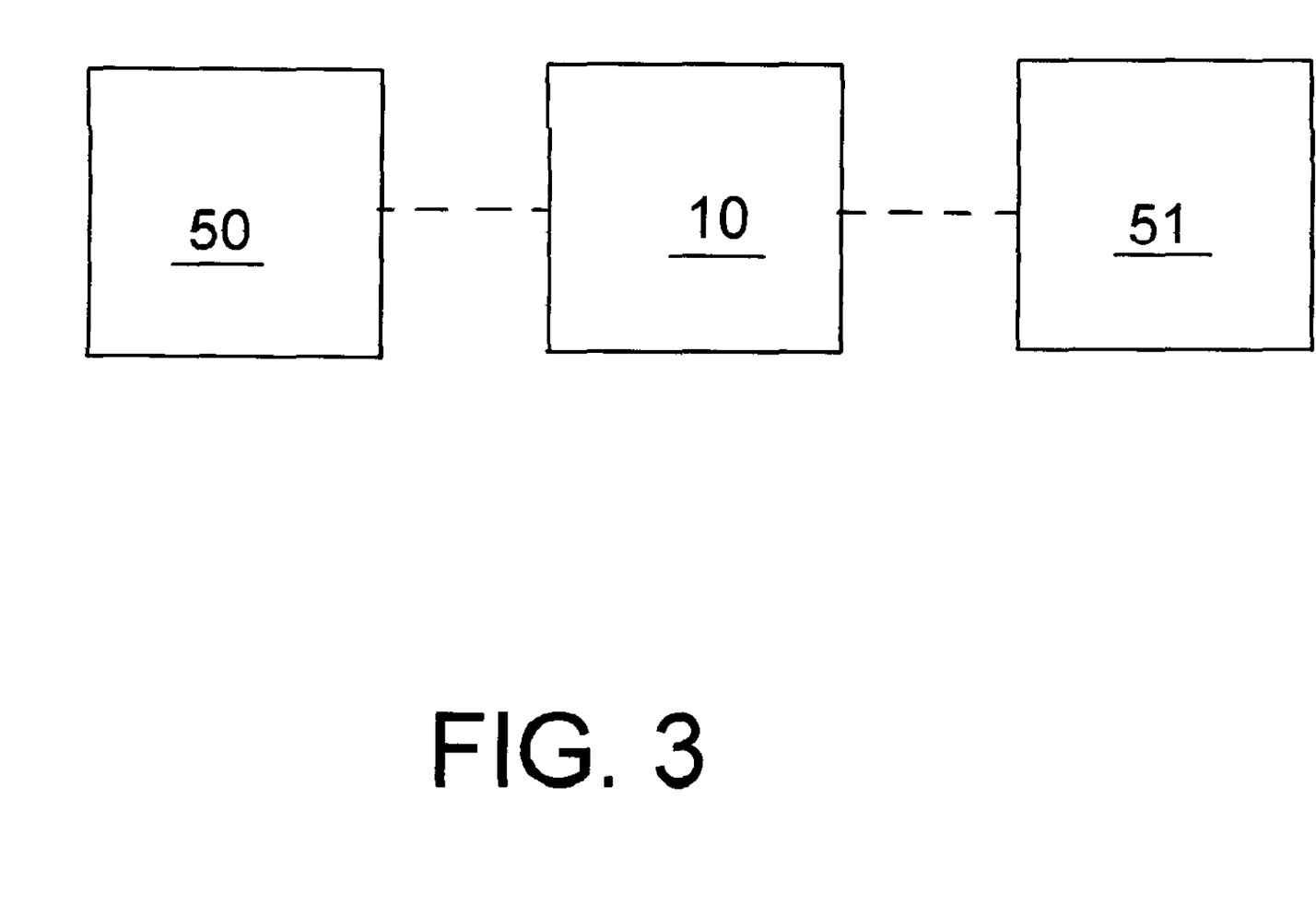
FIG. 3 shows the apparatus of the present application with a conveyor and a treatment machine.

FIG. 3 is a block diagram comprising the apparatus 10 of the present application as well as a conveyor arrangement 50 and a treatment machine 51. The conveyor arrangement 50 may comprise a linear conveyor 50, which laterally feeds containers 9 into the apparatus 10. The apparatus 10 of the present application grasps the containers 9 and accelerates them to a speed sufficient to feed bottles into the treatment machine 51, which may be a rotary treatment machine 51. The treatment machine 51 may comprise a rotary rinsing machine 51, a rotary filling machine 51, a rotary closing or capping machine 51, and/or a rotary labeling machine 51.

Figure 4:
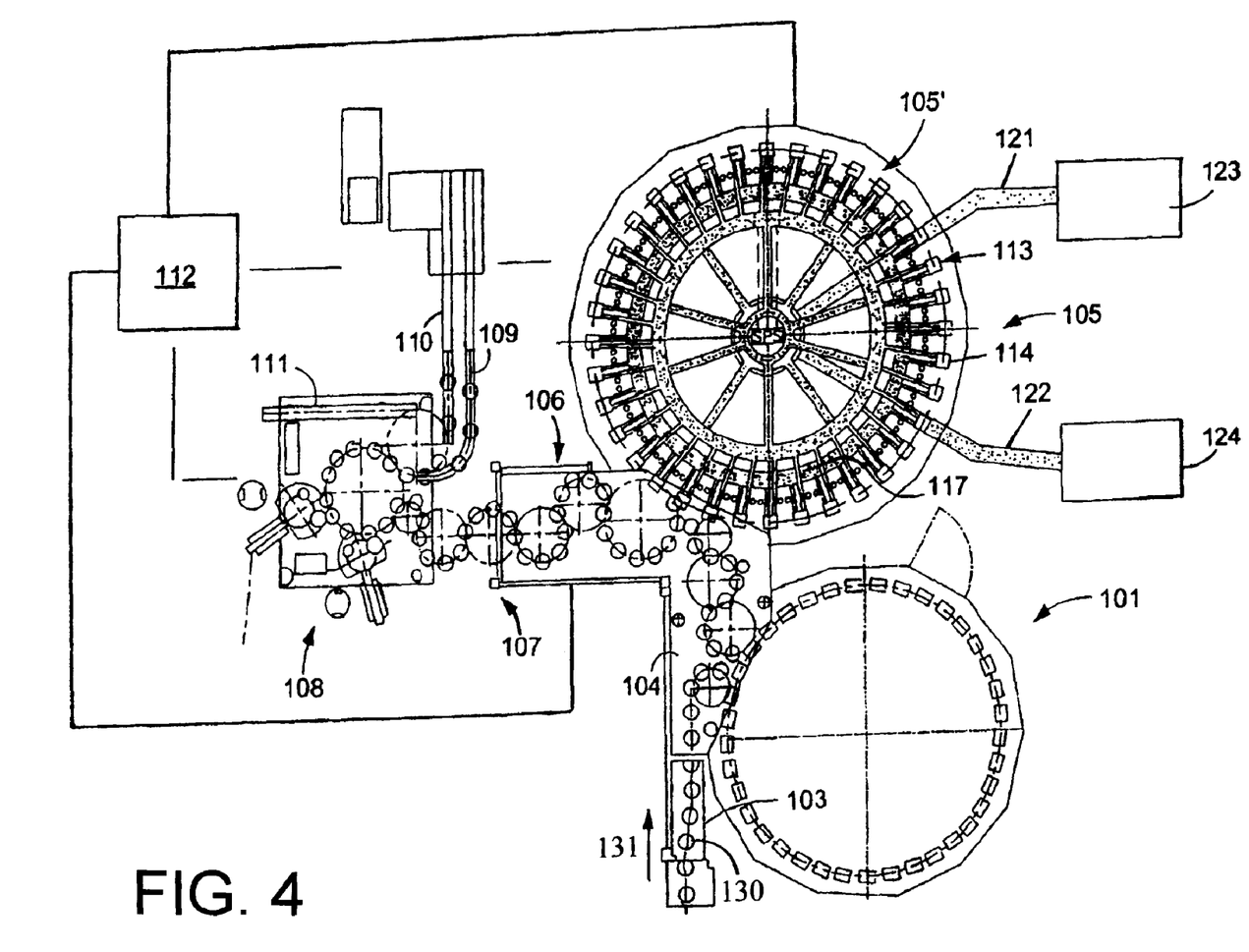
FIG. 4 shows schematically the main components of one possible embodiment example of a system for filling containers, for example a beverage bottling plant for filling bottles with at least one liquid beverage, in accordance with at least one possible embodiment, in which system or plant could possibly be utilized at least one aspect, or several aspects, of the embodiments disclosed herein.

FIG. 4 shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 4 shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 4, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

Figure 5:
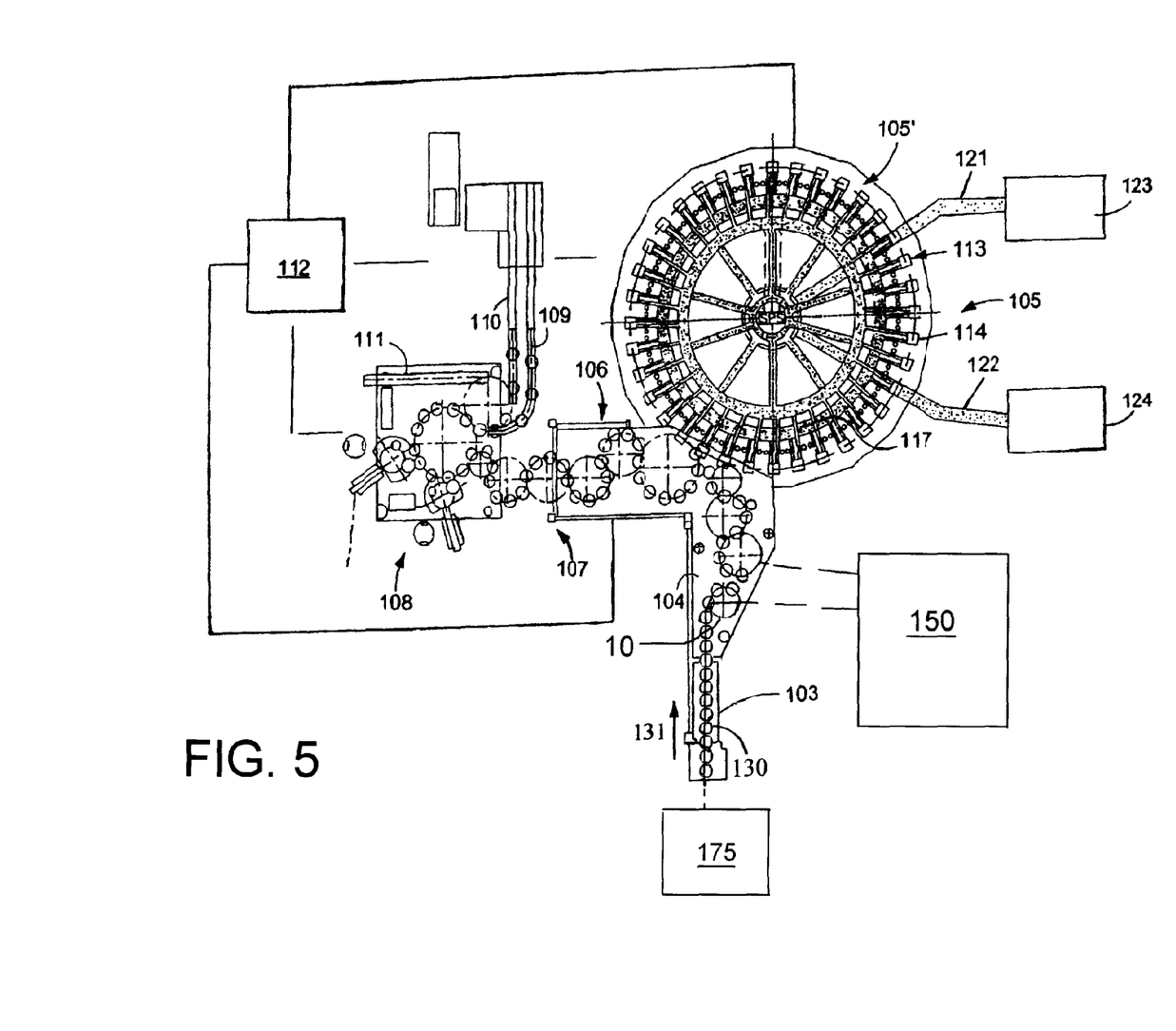
FIG. 5 shows schematically the main components of one possible embodiment example of a system for filling containers, including a blow-molding machine and a sterilizing machine, which could possibly be utilized or adapted for use with the embodiments of the present application disclosed herein.

FIG. 5 shows an additional possible embodiment example of a system for filling containers, for example a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 5 shows a blow molding machine 175, which is configured to blow mold PET bottles or containers 130. The containers 130 may be fed downstream to the next treatment machine with a linear conveyor 103. The containers 130 are transported in a steady, dense flow of containers along the conveyor 103. In the illustrated embodiment of FIG. 5, the containers 130 are fed from the linear conveyor 103 to the feeding arrangement 10. The feeding arrangement 10 is configured to accelerate the containers or beverage bottles 130 to a speed sufficient to feed containers 130 into a sterilization machine 150, for example a rotary sterilization machine 150. The containers 130 are spaced farther apart on the sterilization machine 150 than on the linear conveyor 103. Therefore, although the containers 130 on the linear conveyor 103 and the sterilization machine 150 are transported at the same rate or a similar rate, the containers 130 may be spaced differently, so the feeding arrangement 10 is configured to accelerate the containers 130 to a speed sufficient to feed one container 130 into each receptacle of the sterilization machine 150 to promote optimal processing of the containers 130. Further processing of the containers 130 may occur downstream of the sterilization 150, such as filling, closing, labeling, and packaging of the containers 130. In one possible embodiment, the containers 130 may be fed by the feeding arrangement to a filling machine instead of a sterilization machine.

The present application is not limited to the possible embodiment illustrated above. Numerous modifications and variants can be introduced without going beyond the teaching of the present application. The dimensions and configurations of the guide device and the fastening with the infeed disk can be adapted to specific conditions and requirements. Adaptations can also be made to the materials used. Of course it is also possible to drive the guide device separately or to supplement it with additional guide elements, such as for the external portion of the containers, for example.

An object of the present application is to improve an apparatus for container transport with a rotating infeed disk 4 which grasps a container 9 in its top mouth area so that the reliability of the transport can be improved even at high throughput rates and accelerations.

The present application teaches that an additional co-rotting guide device 11 is provided which acts on the container 9 in its lateral and/or lower area.

One feature or aspect of an embodiment is believed at the time of the filing of this patent application to possibly reside broadly in an apparatus for container transport with a rotating infeed disk 4 which grasps a container 9 in its top mouth area, wherein an additional, co-rotating guide device 11 is provided which acts on the container 9 in its lateral and/or lower area.

Another feature or aspect of an embodiment is believed at the time of the filing of this patent application to possibly reside broadly in the apparatus wherein the guide device 11 is realized for the guidance and/or support of the container 9.

Yet another feature or aspect of an embodiment is believed at the time of the filing of this patent application to possibly reside broadly in the apparatus wherein the guide device 11 is realized for the drive of the container 9.

Still another feature or aspect of an embodiment is believed at the time of the filing of this patent application to possibly reside broadly in the apparatus, wherein the guide device 11 is realized for the protection of the container 9 against falling out of the device.

A further feature or aspect of an embodiment is believed at the time of the filing of this patent application to possibly reside broadly in the apparatus, wherein the guide device 11 is realized so that it can place the container 9 in an upright position from a tilted position.

Another feature or aspect of an embodiment is believed at the time of the filing of this patent application to possibly reside broadly in the apparatus, wherein the guide device 11 grasps the container 9 in its lower lateral area.

Yet another feature or aspect of an embodiment is believed at the time of the filing of this patent application to possibly reside broadly in the apparatus, wherein the guide device 11 grasps the container 9 in its base area.

Still another feature or aspect of an embodiment is believed at the time of the filing of this patent application to possibly reside broadly in the apparatus, wherein the guide device 11 has a wheel flange 12.

A further feature or aspect of an embodiment is believed at the time of the filing of this patent application to possibly reside broadly in the apparatus, wherein the guide device 11 has a base 13.

Another feature or aspect of an embodiment is believed at the time of the filing of this patent application to possibly reside broadly in the apparatus, wherein the guide device 11 is connected with the infeed disk 4 by means of stud bolts.

Yet another feature or aspect of an embodiment is believed at the time of the filing of this patent application to possibly reside broadly in the apparatus, wherein the height and/or diameter of the guide device 11 is adjustable.

Still another feature or aspect of an embodiment is believed at the time of the filing of this patent application to possibly reside broadly in the apparatus, wherein PET bottles are provided as containers 9.

A further feature or aspect of an embodiment is believed at the time of the filing of this patent application to possibly reside broadly in an apparatus for container transport with a rotating infeed disk 4 which grasps a container 9 in its top mouth area, whereby an additional, co-rotating guide device 11 is provided which acts on the container 9 in its lateral and/or lower area and the guide device 11 is realized for the guidance and/or support of the container 9, wherein [A7] the guide device 11 grasps the container 9 in its base area.

One feature or aspect of an embodiment is believed at the time of the filing of this patent application to possibly reside broadly in an accelerator feed arrangement configured to accelerate PET beverage bottles from a linear conveyor of a PET blow molding machine to a rotary PET bottle sterilizing machine and said accelerator feed arrangement is further configured to minimize misalignment and jamming of PET beverage bottles during transport from a linear conveyor of a PET blow molding machine to a rotary PET bottle sterilizing machine in a beverage bottling plant, which PET beverage bottles comprise beverage bottle necks, beverage bottle sides, and beverage bottle bottoms, and which PET beverage bottles have longitudinal axes, said feeding arrangement comprising: an inlet being configured to accept PET beverage bottles from a linear conveyor of a PET blow molding machine; an outlet being configured to move PET beverage bottles into a rotary PET bottle sterilizing machine; an infeed disk being configured to receive PET beverage bottles from said inlet and being further configured to rotate about an axis of rotation; a plurality of moveable grippers being disposed at the circumference of said infeed disk and being configured to grasp necks of PET beverage bottles; said plurality of moveable grippers being configured to accelerate PET beverage bottles from said inlet to said outlet; a motor being configured to rotate said infeed disk and said plurality of moveable grippers; a column operatively connecting said infeed disk and said motor and being configured and disposed to transfer rotating movement from said motor to said infeed disk and said plurality of moveable grippers; said infeed disk being concentric to said column; a first stationary guide rail being configured and disposed to guide the movement of necks of PET beverage bottles in said accelerator feed arrangement as said infeed disk rotates; a second stationary guide rail being configured and disposed to guide the movement of PET beverage bottles by guiding the outermost sides of PET beverage bottles disposed from the center of said accelerator feed arrangement during acceleration of PET beverage bottles; said second stationary guide rail being further configured to guide PET beverage bottles and permit transport of PET beverage bottles to maintain the substantially vertical alignment of the beverage bottle longitudinal axes with sufficient precision to minimize misalignment and jamming of PET beverage bottles in said accelerator feed arrangement and said rotary PET bottle sterilizing machine; a guide device separate and disposed away from said first stationary guide rail, said second stationary guide rail, and said plurality of moveable grippers; said separate guide device being configured and disposed to: support and guide bottoms of PET beverage bottles in said accelerator feed arrangement; rotate synchronously with said infeed disk and said plurality of moveable grippers to guide the movement of bottoms of PET beverage bottles; and permit transport of PET beverage bottles to maintain the substantially vertical alignment of the beverage bottle longitudinal axes with sufficient precision to minimize misalignment and jamming of PET beverage bottles in said outlet of said accelerator feed arrangement and said rotary PET bottle sterilizing machine; said separate guide device comprising a base portion and a wheel flange portion; said plurality of moveable grippers, said second stationary guide, and said separate guide device being configured to together permit transport of PET beverage bottles to maintain the substantially vertical alignment of the beverage bottle longitudinal axes with sufficient precision to minimize misalignment and jamming of PET beverage bottles in said accelerator feed arrangement and said rotary PET bottle sterilizing machine; a plurality of stud bolts operatively connecting said infeed disk and said separate guide device and being configured to adjust the position of said separate guide device to permit the transport of PET beverage bottles with varying heights; and said separate guide device being radially adjustable to transport PET beverage bottles with varying diameters.

Another feature or aspect of an embodiment is believed at the time of the filing of this patent application to possibly reside broadly in a feed arrangement configured to accelerate plastic containers from a linear conveyor configured to convey plastic containers to a rotary plastic container handling machine and said feed arrangement is further configured to minimize misalignment and jamming of plastic containers during transport from a linear conveyor to a rotary plastic container handling machine in a container filling plant, which plastic containers comprise container necks, container sides, and container bottoms, and which plastic containers have longitudinal axes, said feeding arrangement comprising: an inlet being configured to accept plastic containers from a linear conveyor configured to convey plastic containers; an outlet being configured to move plastic containers into a rotary plastic container handling machine; an infeed structure being configured to receive plastic containers from said inlet and said infeed structure being further configured to rotate about an axis of rotation; a plurality of moveable grippers being disposed about the circumference of said infeed structure and being configured to grasp necks of plastic containers; said plurality of moveable grippers being configured to accelerate plastic containers from said inlet to said outlet; a motor being configured to rotate said infeed structure and said plurality of moveable grippers; a support structure operatively connecting said infeed structure and said motor and being configured and disposed to transfer rotating movement from said motor to said infeed structure and said plurality of moveable grippers; a first stationary guide rail being configured and disposed to guide the movement of necks of plastic containers in said feed arrangement as said infeed structure rotates; a second stationary guide rail being configured and disposed to guide the movement of plastic containers by guiding the sides of plastic containers during acceleration of plastic containers; said second stationary guide rail being further configured to guide plastic containers and permit transport of plastic containers to maintain the substantially vertical alignment of the container longitudinal axes with sufficient precision to minimize misalignment and jamming of plastic containers in said feed arrangement and said rotary plastic container handling machine; and a separate guide device being configured and disposed to: support and guide bottoms of plastic containers in said feed arrangement; rotate synchronously with said infeed structure and said plurality of moveable grippers to guide the movement of bottoms of plastic containers; and permit transport of plastic containers to maintain the substantially vertical alignment of the container longitudinal axes with sufficient precision to minimize misalignment and jamming of plastic containers in said feed arrangement and said rotary plastic container handling machine.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the International Search Report dated Mar. 18, 2008, and/or cited elsewhere are hereby incorporated by reference as if set forth in their entirety herein as follows: WO 01/62636, having the title "DEVICE FOR TRANSFERRING CONTAINERS COMPRISING A GUIDE WHEEL WITH VARIABLE GEOMETRY," published on Aug. 30, 2001.

One example of a transfer device having components which may be utilized in at least one possible embodiment of the present application may possibly be found in U.S. Pat. No. 7,200,975, having and title "BEVERAGE BOTTLING PLANT FOR FILLING BOTTLES WITH A LIQUID BEVERAGE FILLING MATERIAL, HAVING A TRANSFER DEVICE FOR THE TRANSFER OF CONTAINERS FROM A TRANSFER STARWHEEL TO THE CAROUSEL OF A CONTAINER HANDLING MACHINE," which is hereby incorporated by reference as if set forth in its entirety herein.

Some examples of starwheels which may possibly be utilized or adapted for use in at least one possible embodiment may possibly be found in the following U.S. Pat. No. 5,613,593, entitled "Container handling starwheel;" U.S. Pat. No. 5,029,695, entitled "Improved starwheel;" U.S. Pat. No. 4,124,112, entitled "Odd-shaped container indexing starwheel;" and U.S. Pat. No. 4,084,686, entitled "Starwheel control in a system for conveying containers."

Some examples of stepping motors that may possibly be utilized or possibly adapted for use in at least one possible embodiment of the present application may possibly be found in the following U.S. Pat. No. 6,348,774 issued to Andersen et al. on Feb. 19, 2002; U.S. Pat. No. 6,373,209 issued to Gerber et al. on Apr. 16, 2002; U.S. Pat. No. 6,424,061 issued to Fukuda et al. on Jul. 23, 2002; U.S. Pat. No. 6,509,663 issued to Aoun on Jan. 21, 2003; U.S. Pat. No. 6,548,923 to Ohnishi et al. on Apr. 15, 2003; and U.S. Pat. No. 6,661,193 issued to Tsai on Dec. 9, 2003.

Some examples of servo-motors that may possibly be utilized or possibly adapted for use in at least one possible embodiment of the present application may possibly be found in the following U.S. Pat. No. 4,050,434 issued to Zbikowski et al. on Sep. 27, 1977; U.S. Pat. No. 4,365,538 issued to Andoh on Dec. 28, 1982; U.S. Pat. No. 4,550,626 issued to Brouter on Nov. 5, 1985; U.S. Pat. No. 4,760,699 issued to Jacobsen et al. on Aug. 2, 1988; U.S. Pat. No. 5,076,568 issued to de Jong et al. on Dec. 31, 1991; and U.S. Pat. No. 6,025,684 issued to Yasui on Feb. 15, 2000.

Some examples of synchronous motors which may possibly be utilized or adapted for use in at least one possible embodiment may possibly be found in the following U.S. Pat. No. 6,713,899, entitled "Linear synchronous motor;" U.S. Pat. No. 6,486,581, entitled "Interior permanent magnet synchronous motor;" U.S. Pat. No. 6,424,114, entitled "Synchronous motor;" U.S. Pat. No. 6,388,353, entitled "Elongated permanent magnet synchronous motor;" U.S. Pat. No. 6,329,728, entitled "Cylinder-type linear synchronous motor;" U.S. Pat. No. 6,025,659, entitled "Synchronous motor with movable part having permanent magnets;" U.S. Pat. No. 5,936,322, entitled "Permanent magnet type synchronous motor;" and U.S. Pat. No. 5,448,123, entitled "Electric synchronous motor."

One example of a sterilization machine, which may possibly be utilized or adapted for use with at least one possible embodiment of the present application may possibly be found in U.S. patent application Ser. No. 11/175,118, filed on Jul. 5, 2005, having, and title "BEVERAGE BOTTLING PLANT FOR FILLING BOTTLES WITH A LIQUID BEVERAGE MATERIAL HAVING A DEVICE TO TREAT BOTTLES AND A METHOD OF TREATING BOTTLES WITH SAID DEVICE," which is hereby incorporated by reference as if set forth in its entirety herein.

Some examples of apparatus and methods of sterilizing or cleaning containers that may possibly be utilized or possibly adapted for use in at least one possible embodiment of the present application may possibly be found in the following U.S. Pat. No. 5,092,356 issued to Grot on Mar. 3, 1992; U.S. Pat. No. 5,320,144 issued to Ahlers on Jun. 14, 1994; U.S. Pat. No. 5,533,552 issued to Ahlers on Jul. 9, 1996; U.S. Pat. No. 5,558,135 issued to Kronseder et al. on Sep. 24, 1996; and U.S. Pat. No. 5,896,899 issued to Schlitz on Apr. 27, 1999.

Some examples of blow-molding machines, which may possibly be utilized or adapted for use in at least one possible embodiment of the present application, may possibly be found in the following U.S. Pat. No. 6,905,326, having the title "BLOW MOLDING MACHINE COMPRISING CONTROL VALVES, WHICH ARE MOUNTED ON THE BLOWING DEVICE AND WHICH CONTROL THE BLOWING AIR," published on Jun. 14, 2005; U.S. Pat. No. 6,428,735, having the title "METHOD FOR MAKING A CARBONATED SOFT DRINK BOTTLE WITH AN INTERNAL WEB AND HAND-GRIP FEATURE," published on Aug. 6, 2002; No. 4,470,796, having the title "APPARATUS FOR MOLDING HOLLOW PLASTIC ARTICLES," published on Sep. 11, 1984; and U.S. Pat. No. 6,554,602, having the title "MACHINE FOR MAKING A CARBONATED SOFT DRINK BOTTLE WITH AN INTERNAL WEB AND HAND-GRIP FEATURE," published on Apr. 29, 2003.

Some examples of grippers or transport systems configured to transfer bottles or container by the container neck, which may possible be utilized or adapted for use in at least one possible embodiment of the present application, may possibly be found in the following: U.S. patent application Ser. No. 12/353,999, having the title "ROTARY BEVERAGE BOTTLE FILLING MACHINE CONFIGURED TO FILL BEVERAGE BOTTLES WITH DIFFERENT DIAMETERS, SIZES, AND SHAPES WITHOUT CHANGING BOTTLE CARRIERS AND A CONTAINER TREATMENT MACHINE CONFIGURED TO HANDLE CONTAINERS WITH DIFFERENT DIAMETERS, SIZES, AND SHAPES WITHOUT CHANGING CONTAINER CARRIERS," filed on Jan. 15, 2009; U.S. Pat. No. 7,028,857, having the title "PLASTIC WATER BOTTLE AND APPARATUS AND METHOD TO CONVEY THE BOTTLE AND PREVENT BOTTLE ROTATION," published Apr. 18, 2006; U.S. Pat. No. 7,454,878, having the title "ANTI-ROTATION NECK SUPPORT KNIFE," published on Nov. 25, 2008; U.S. Pat. No. 5,299,889, having the title "PNEUMATIC CONVEYOR APPARATUS," published on Apr. 5, 1994; and U.S. Pat. No. 5,484,237, having the title "PNEUMATIC CONVEYOR APPARATUS HAVING AIR DEFLECTORS," published on Jan. 16, 1996.

The patents, patent applications, and patent publication listed above in the preceding ten paragraphs are herein incorporated by reference as if set forth in their entirety. The purpose of incorporating U.S. patents, non-U.S. patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2006 055 317.9, filed on Nov. 23, 2006, having inventor Herbert BERNHARD, and DE-OS 10 2006 055 317.9 and DE-PS 10 2006 055 317.9, and International Application No. PCT/EP2007/009691, filed on Nov. 8, 2007, having WIPO Publication No. WO 2008/061637 and inventor Herbert BERNHARD, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the corresponding foreign equivalent patent application(s), that is, PCT/EP2007/009691 and German Patent Application 10 2006 055 317.9, is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/009691 and DE 10 2006 055 317.9 from which this patent application claims priority which do not have to do with the correction of the translation in this patent application are not to be included in this patent application in the incorporation by reference.

Any statements about admissions of prior art in the original foreign patent applications PCT/EP2007/009691 and DE 10 2006 055 317.9 are not to be included in this patent application in the incorporation by reference, since the laws relating to prior art in the German and European Patent Offices are substantially different from the patent laws of the United States Patent and Trademark Office.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE

1 Apparatus of the prior art for container transport
2 Transfer point
3 Guide rail
4 Infeed disk
5 Electric motor
6 Gearing
7 Stop guide
8 Stop rail
9 Container
10 Apparatus according to the present application
11 Guide device
12 Wheel flange
13 Base
14 Stud bolts
15 Axis of rotation

What is claimed is:

1. An infeed device comprising:
an infeed device being configured to feed containers into a container handling machine;
a rotatable infeed disc being configured to grasp an upper mouth portion of a container;
a guide device being configured to rotate with said infeed disc and to engage lower and lateral portions of a container to guide and support the container; and
said guide device comprising a bottom portion configured to contact and hold a radially-inner portion of the bottom of a container.

2. The infeed device according to claim 1, wherein said guide device comprises a wheel-shaped flange configured to contact a lateral portion of a container.

3. The infeed device according to claim 2, wherein said guide device is configured to drive a container.

4. The infeed device according to claim 3, wherein said guide device is configured and disposed to minimize containers falling out of the infeed device during handling.

5. The infeed device according to claim 4, wherein said guide device is configured to adjust the orientation of a container from an inclined position to an upright vertical position.

6. The infeed device according to claim 5, wherein said guide device is connected to said infeed disc by stud bolts.

7. The infeed device according to claim 6, wherein the height of said guide device is adjustable via said stud bolts to permit handling of containers of varying heights.

8. The infeed device according to claim 7, wherein the diameter of said guide device is adjustable to permit handling of containers of varying diameters.

9. The infeed device according to claim 8, wherein the infeed device is configured to handle PET bottles.

10. The infeed device according to claim 1, wherein:
said guide device is connected to said infeed disc by stud bolts, and the height of said guide device is adjustable via said stud bolts to permit handling of containers of varying heights; and
the diameter of said guide device is adjustable to permit handling of containers of varying diameters.

11. The infeed device according to claim 1, wherein the height of said guide device is adjustable to permit handling of containers of varying heights.

12. The infeed device according to claim 1, wherein the diameter of said guide device is adjustable to permit handling of containers of varying diameters.

13. The infeed device according to claim 1, further comprising a guide rail configured to guide containers in a linear direction to said infeed disc and said guide device.

14. The infeed device according to claim 13, wherein said infeed disc and said guide device are configured to accelerate the speed of movement of containers to a speed greater than the speed of movement of the containers through said guide rail.

15. The infeed device according to claim 14, wherein the infeed device is configured to contact a container at an upper and lower portion substantially simultaneously to minimize tipping over of the container due to forces of acceleration.

16. The infeed device according to claim 1, wherein:
said guide device is a one-piece structure which comprises a wheel-shaped flange and a disc;
said flange is configured to contact a lateral portion of the container which extends to the bottom of the container; and
said disc is configured to extend radially-outwardly from said flange and is configured to contact and support the bottom of a container.

17. The infeed device according to claim 1, wherein the infeed device further comprises a lateral stop guide configured and disposed to contact a lateral, central portion of a container on a side opposite said guide device, and a stop rail which extends from said guide stop in the direction of movement of containers.

18. The infeed device according to claim 1, wherein the infeed device comprises an arrangement configured to connect the infeed device to a container handling machine.

19. The infeed device according to claim 1, in combination with a container handling machine configured to receive containers from the infeed device.

20. The combination according to claim 19, wherein said container handling machine is configured to handle PET bottles.

* * * * *